(12) United States Patent
Schwab et al.

(10) Patent No.: US 10,237,001 B2
(45) Date of Patent: Mar. 19, 2019

(54) METHOD AND MEASURING DEVICE FOR INTERMODULATION MEASUREMENT

(71) Applicant: ROSENBERGER HOCHFREQUENZTECHNIK GMBH & CO. KG, Fridolfing (DE)

(72) Inventors: Martin Schwab, Geretsried (DE); Christian Entsfellner, Fridolfing (DE); Benjamin Kaindl, Fridolfing (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 63 days.

(21) Appl. No.: 15/310,867

(22) PCT Filed: Sep. 19, 2014

(86) PCT No.: PCT/EP2014/002549
§ 371 (c)(1),
(2) Date: Nov. 14, 2016

(87) PCT Pub. No.: WO2015/172798
PCT Pub. Date: Nov. 19, 2015

(65) Prior Publication Data
US 2017/0126337 A1      May 4, 2017

(30) Foreign Application Priority Data

May 15, 2014   (DE) .................. 10 2014 007 151

(51) Int. Cl.
*H04B 17/17*   (2015.01)
*H04B 3/46*   (2015.01)
(Continued)

(52) U.S. Cl.
CPC ............. *H04B 17/17* (2015.01); *H04B 3/46* (2013.01); *H04B 17/318* (2015.01); *H04L 27/12* (2013.01)

(58) Field of Classification Search
CPC .. G01R 31/11; H04B 17/0085; H04B 17/103; H04B 3/46; H04B 17/17; H04L 1/24; H04L 27/12
(Continued)

(56) References Cited

U.S. PATENT DOCUMENTS

| | | | |
|---|---|---|---|
| 6,144,692 A | 11/2000 | Beck | |
| 2010/0164504 A1* | 7/2010 | Bradley | H04B 3/46 |
| | | | 324/520 |

FOREIGN PATENT DOCUMENTS

WO         200227983 A2       4/2002

OTHER PUBLICATIONS

Shang Wu et al: 11 Noncontact Probes for Wire Faultlocation With Reflectometry 11, IEEE Sensors Journal, IEEE Service Center, New York, NY, US, vo 1 . 6, No. 6, Dec. 1, 2006 (Dec. 1, 2006), pp. 1716-1721, XP011150512, ISSN: 1530-437X, DOI: 10.1109/JSEN. 2006.884560 the whole document.

* cited by examiner

*Primary Examiner* — Leila Malek
(74) *Attorney, Agent, or Firm* — DeLio, Peterson & Curcio, LLC; Robert Curcio

(57) ABSTRACT

A method for intermodulation measurement for locating points in a signal transmission path for a high-frequency signal that are faulty with regard to HF transmission properties of the signal transmission path, by generating a first HF signal $u_{Test}$, having a carrier frequency $f_1$ and a digital signal $u_{Code}$ modulated thereon; generating a second HF signal $u_2$ having a frequency $f_2$; introducing the first HF signal $u_{Test}$ and the second HF signal $u_2$ into the signal transmission path at a predetermined introduction point; receiving an intermodulation product, which is generated in the signal transmission path from the first HF signal and the second HF signal at at least one faulty point, as an inter- (Continued)

modulation product signal $u_{RX}$; recovering a digital signal $u_{demod}$ from $u_{RX}$; and determining a time shift $t_x$ between the digital signal $u_{Code}$ and the recovered digital signal $u_{demod}$. The invention further relates to a measuring device for performing this method.

16 Claims, 8 Drawing Sheets

(51) Int. Cl.
  *H04B 17/318* (2015.01)
  *H04L 27/12* (2006.01)
(58) Field of Classification Search
  USPC .......................................................... 375/226
  See application file for complete search history.

a)                          b)

METHOD AND MEASURING DEVICE FOR INTERMODULATION MEASUREMENT

BACKGROUND OF THE INVENTION

1. Field of the Invention

The present invention relates generally to measuring systems for radio-frequency communication systems and specifically to measuring devices for the measurement of passive intermodulation. In particular, the present invention relates to a method for intermodulation measurement such as a method for locating points in a signal transmission path for a radio-frequency signal which are faulty with regard to radio-frequency transmission properties of the signal transmission path. The invention further relates to a method and a measuring device for bandwidth-optimized distance measurement in PIM measuring devices.

2. Description of Related Art

Description of Passive Intermodulation (PIM)

The quality of a connection between a fixed transmitting and receiving device (BTS, base transceiver station) and a terminal device (UE, user equipment) plays an important role in modern mobile networks. Due to the high generated transmitting power in the BTS on the one hand and the necessary sensitivity of the receivers of the BTS and UE on the other hand, faults in the transmission path can significantly influence the sensitivity of the receivers and thus the quality of the connection.

One key effect which causes interference in the transmission path is intermodulation. For example, through intermodulation, two transmission signals with two different carrier frequencies which are generated with high power in a BTS generate interfering signals at points with non-linear transmission behavior (often simply referred to as "non-linearities"), the frequencies of which are sums and differences of integral multiples of the frequencies of the transmission signals. Some of these interfering signals can fall within the reception band of the BTS and thus adversely affect the quality of the communication. If these interfering signal are generated in passive elements, this is referred to as passive intermodulation (PIM).

FIG. 1 is a schematic representation showing a signal transmission path from a BTS up to an antenna. The BTS 10 is connected with the antenna 13 via a first filter 11 and a second filter 12. The BTS 10, the filters 11 and 12 and the antenna 13 are connected together via radio-frequency cables 14, 15 and 16, which are connected to the respective elements via radio-frequency connectors 17 to 22. PIM can occur in all components 11 to 22 of the transmission path. For example, corrosion in plug connectors, oxide coatings on contacts and metal-metal transitions, impurities in materials and insufficiently fastened plug connections can cause PIM.

In order to ensure and check the quality of the transmission device, measurements of the PIM are carried out. Since PIM occurs in particular at high powers, as a rule this is measured with the use of high transmitting power, for example 2*20 W. It is of particular importance for measurement of a transmission installation as shown in FIG. 1 to be able to localize a possible fault along the transmission path from the BTS 10 up to the antenna 13 in order to identify defective components in the transmission path and specifically eliminate the fault. A high resolution, for example into the 10 cm range, greatly simplifies fault location.

The publication DE 199 46 763 A1 describes a method for measuring cable properties of a telecommunications cable. An echo signal reflected from the end of the cable is thereby evaluated. This method cannot be used to locate points with non-linear transmission behavior.

Points with non-linear transmission behavior can be located through the method described in the publication DE 10 2012 023 448 A1. However, this method involves considerable complexity in terms of measuring, since it requires that several RF signals be generated and an intermodulation product derived from these, and that a cross-correlation between intermodulation product signals be carried out. Due to its complexity, this method can lead to an insufficient resolution in terms of location.

Structure of PIM Measuring Devices

The structure of a known PIM measuring device is described in the publication DE 10 2010 015 102 A1. Such a measuring device is represented in FIG. 2 and will be explained briefly in the following.

PIM Distance Measurement

Signals with the frequencies $f_1$ and $f_2$ are generated in two signal sources 101 and 102, whereby the signal $u_{sweep}$ from the signal source 101 is periodically swept over a defined frequency range $\Delta f$ starting with the frequency $f_1$. The frequency of the signal $u_{sweep}$ is illustrated by way of example in FIG. 3. The signal $u_{sweep}$ is modified in the mixer 111 through multiplication with the signal from the signal source 102, doubled in the frequency doubler, in such a way that the resulting signal $u_{ref}$ has the same frequency and signal form as the PIM signal generated in the signal transmission path or in the DUT 120. As a result of the runtime of the PIM in the signal transmission path over the path distance l, $u_{rx}$ is received with a delay of dt in comparison with $u_{ref}$, where:

$$dt = (2l\varepsilon_{reff})/c_0 \quad (1)$$

$c_0$ representing the speed of light, $\varepsilon_{reff}$ the effective dielectric constant of the cable with the path distance l. FIG. 3 illustrates how the time delay dt in comparison with signal $u_{ref}$ gives rise to a frequency difference df between $u_{ref}$ and $u_{rx}$. The signal $u_b$ is generated through multiplication of the signal $u_{ref}$ and $u_{rx}$ in the mixer 112. The frequency of $u_b$ is a measure for the distance l of the interference signal from the measuring device. The calculation of the distance l from $u_b$ takes place in the evaluation unit 113.

Which Problem is Solved

The transmission devices according to FIG. 1 are bandwidth-limited systems. The filters 11 and 12 as well as filters within the BTS usually limit the bandwidth to the transmission and reception band relevant for the transmission device. Through the limited bandwidth on the one hand and the frequency modulation method, with its poor bandwidth efficiency, on the other hand, limits arise with respect to the resolution of fault location which limit the accuracy of the measuring method according to DE 10 2010 015 102 A1.

In view of the problems described, the invention is based on the object of modifying a method of the aforementioned type in such a way that points in a signal transmission path which are defective in terms of RF transmission characteristics can be located as precisely as possible, so that the troubleshooting is simplified, whereby the method should be simple and possible to carry out without a complex measuring set-up.

SUMMARY OF THE INVENTION

According to the invention this problem is solved through a method of the aforementioned type with the method steps set forth in the independent claims. Advantageous embodiments of the invention are described in the further claims.

According to the invention, in a method of the aforementioned type the following method steps are provided:
(a) generating a first RF signal $u_{Test}$ which has a carrier frequency $f_1$ and a digital signal $u_{Code}$ modulated thereon;
(b) generating a second RF signal $u_2$ having a frequency $f_2$;
(c) introducing the first RF signal $u_{Test}$ and the second RF signal $u_2$ into the signal transmission path at a predetermined introduction point;
(d) receiving an intermodulation product, which is generated in the signal transmission path from the first RF signal and the second RF signal at at least one faulty point, in the form of an intermodulation product signal $u_{RX}$;
(e) recovering a digital signal $u_{demod}$ from the intermodulation product signal; and
(f) determining a time shift $t_x$ between the digital signal $u_{Code}$ and the recovered digital signal $u_{demod}$.

The intermodulation product received in step (d) can be an intermodulation product reflected back to the introduction point from a point with non-linear transmission function.

The recovery of the digital signal from the intermodulation product signal in step (e) can in particular comprise a demodulation and/or an analogue-digital conversion.

Digital signals also comprise digitized signals.

A length l between the introduction point or a predefined reference plane in the signal transmission path, on the one hand, and the point in the signal transmission path at which the signal received signal in step (d) was generated on the other hand can then be calculated from the time shift $t_x$ determined in step (f), so that the location of the faulty point can be deduced.

The method according to the invention has the advantage that points with non-linear transmission function can be located very precisely in the signal transmission path without this requiring mechanical intervention in the signal transmission path. This greatly simplifies and shortens the fault location process, since it can be determined within a short time which component of the signal transmission path contains a fault and where within this component the fault is located. The location of the defective point is thereby determined in a simple manner without using complex apparatus and without complex mathematical operations.

The above and other objects, which will be apparent to those skilled in the art, are achieved in the present invention which is directed to a method for locating points in a signal transmission path for a radio-frequency signal which is faulty with regard to radio-frequency transmission properties of the signal transmission path, wherein a first RF signal $u_{Test}$ which has a carrier frequency $f_1$ is generated, said method comprising: (a) modulating a digital signal $u_{Code}$ onto the first RF signal $u_{Test}$; (b) generating a second RF signal $u_2$ having a frequency $f_2$; (c) introducing the first RF signal $u_{Test}$ and the second RF signal $u_2$ into the signal transmission path at a predetermined introduction point; (d) receiving an intermodulation product, which is generated in the signal transmission path from the first RF signal and the second RF signal at at least one faulty point and reflected back to the introduction point, in the form of an intermodulation product signal $u_{RX}$; (e) recovering a digital signal $u_{demod}$ from the intermodulation product signal through modulation; (f) determining a time shift $t_x$ between the digital signal $u_{Code}$ and the recovered digital signal $u_{demod}$; and (g) calculating the length L between the introduction point and the point in the signal transmission path at which the signal received in step (d) was generated from the time shift $t_x$ determined in step (f).

The method including multiplying a periodic frame-clock signal $u_{frame}$ by a spreading code $u_{code'}$ in order to generate the digital signal $u_{Code}$ in step (a).

The spreading code $u_{Code'}$ has a sequence of chips, wherein a length of the frame-clock of the frame-clock signal $u_{frame}$, a length of the spreading code $u_{Code'}$ and/or the number of chips of the spreading code $u_{Code'}$ are calculated such that a resulting bandwidth of the first RF signal $u_{Test}$ and/or of the intermodulation product signal $u_{RX}$ adapted to the length of the signal transmission path and/or to a used transmission and/or reception bandwidth of the signal transmission path is obtained.

A bandwidth-efficient digital modulation method including Frequency Shift Keying FSK or Continuous Phase Frequency Shift Keying CPFSK or Minimum Shift Keying MSK may be used in step (a).

The length L is calculated according to the formula:

$$L = \frac{1}{2} \cdot t_x \cdot c,$$

where c is a speed of propagation of RF signals in the signal transmission path.

In step (f), the relative phase positions of the digital signal $u_{Code}$ and the recovered digital signal $u_{demod}$ are shifted relative to one another until the digital signals are congruent, and/or the product signal is substantially at a maximum, wherein the time difference $t_x$ is determined from the phase shift required to achieve congruence or the maximum.

Furthermore, in step (f), the recovered digital signal $u_{demod}$ may be passed with different predefined delays, for example at intervals of in each case a predefined fraction of a chip duration to three or more receivers and multiplied therein by the delayed, digital signal $u_{Code}$, or vice versa.

The product signal, as a function of the time shift, may be approximated through a polynomial function, the coefficients of which are calculated from the multiplication values determined by the three or more receivers, wherein at least one maximum of the polynomial function is then preferably calculated from the coefficients.

The time shift may be determined in step (f) by a cross-correlation.

A third order intermodulation product IM3, in particular the intermodulation product with the carrier frequency $2 \times f_1 - f_2$ or $2 \times f_2 - f_1$, is received in step (d).

The signal $u_{RX}$ received in step (d) may contain intermodulation signal components generated at several faulty points of the signal transmission path, wherein at least one value of one of the intermodulation signal components are determined, including a time shift with respect to a further intermodulation signal component or with respect to the digital signal $u_{Code}$, a curve, an amplitude, or The method may further include determining at least one overall value such as the overall power or the signal strength of the intermodulation components generated in a predefined partial section including an input section or a measuring section of the signal transmission path.

The method further including measuring the power of intermodulation signal components depending on their point of generation and/or a measure for the added power of intermodulation signal components with a delay time $t_x > x$, where x is a predefined threshold delay $t_{min}$ are determined.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
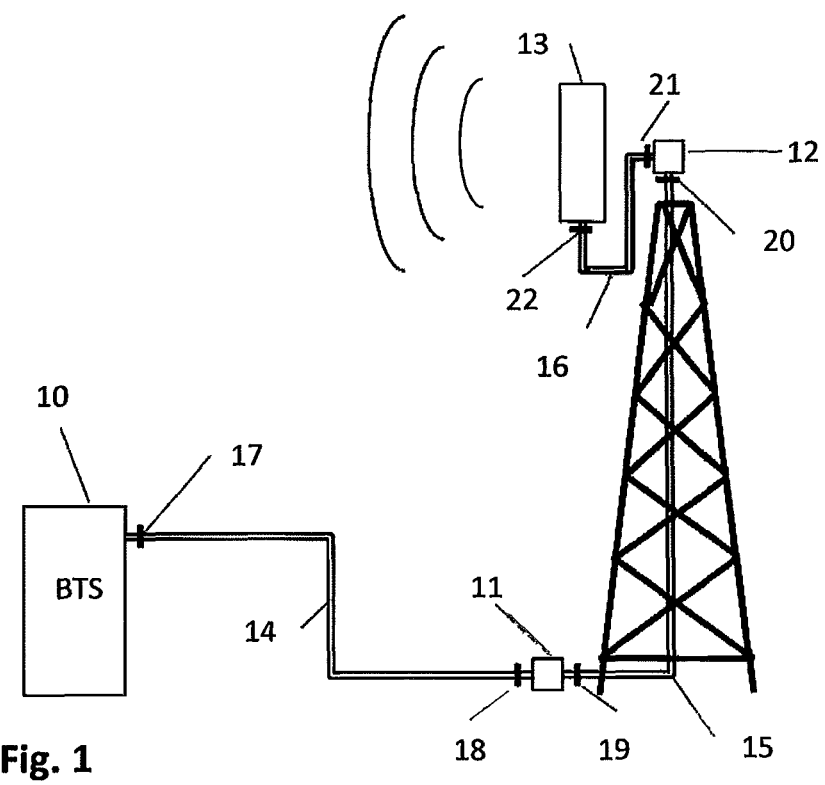
FIG. 1 is a schematic representation which shows a signal transmission path from a BTS to an antenna.
Figure 2:
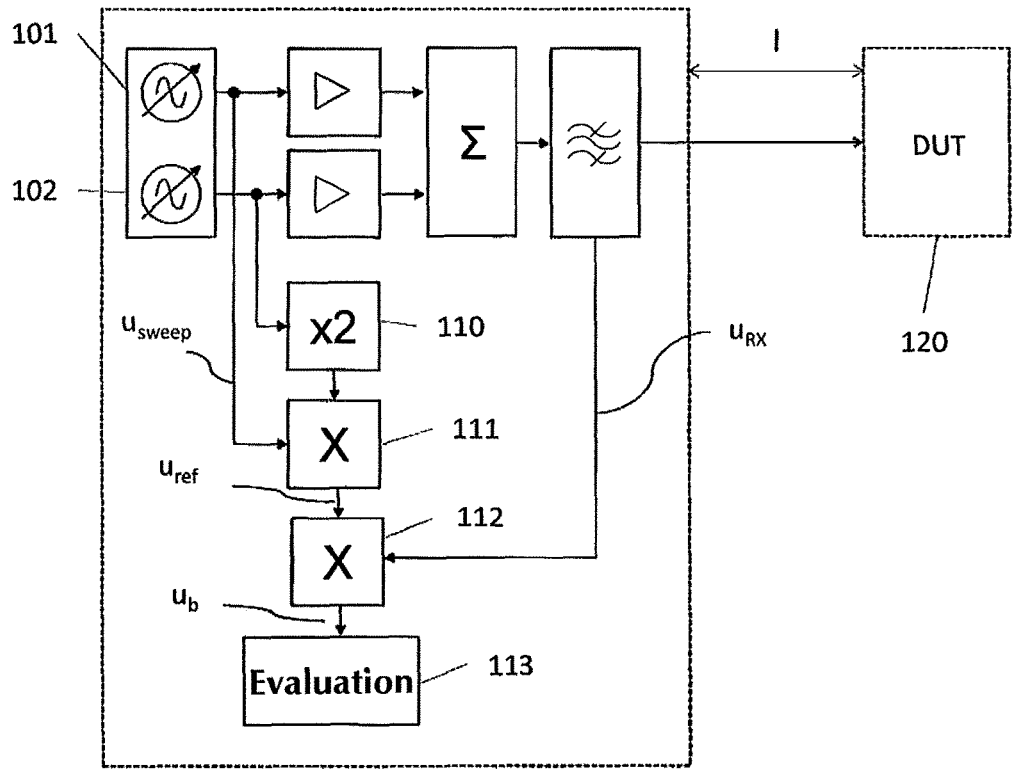
FIG. 2 is a block diagram illustrating the set-up of a conventional measuring device for distance measurement.
Figure 3:
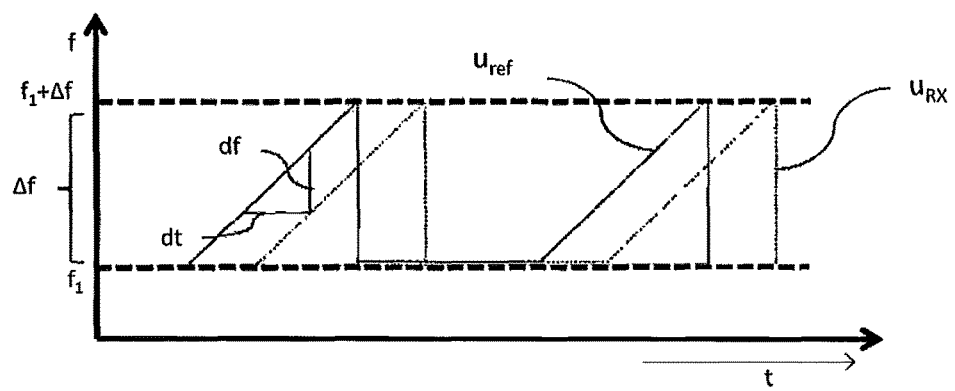
FIG. 3 is a representation of the frequency curve of a measuring signal of a conventional measuring device for distance measurement.

In describing the preferred embodiment of the present invention, reference will be made herein to FIGS. 1-13 of the drawings in which like numerals refer to like features of the invention.

In comparison with the method described in the publication DE 10 2012 023 448 A1, the method according to the invention has the advantage that no intermodulation product needs to be artificially generated from the first RF signal and from the second RF signal in order to correlate this generated intermodulation product with the intermodulation product reflected from the faulty point. This greatly simplifies the measuring set-up and the performance of the measurement.

The invention is based on the knowledge that a digital signal, also in the case of a non-linear conversion of an RF signal which contains the digital signal which has been modulated thereon, also, in particular, following the generation of an intermodulation product from the RF signal, is still contained, as such, in the intermodulation product and can be extracted from this, in particular through demodulation. Even if the non-linear process leads to the generation of an additional signal with a changed fundamental frequency, the original digital signal can be decoupled from this and recovered in its original form. In other words, according to the invention the new fundamental frequency of the mixed product generated from the two RF signals is used to filter the intermodulation product from the reflected signal, while the time shift is determined in order to calculate the location of the faulty point between the original digital signal and the digital signal which can be recovered from the intermodulation product.

Also, a time shift between two digital signals can be determined much more precisely and simply than between two analog signals, for example as described in the publication DE 10 2010 015 102 A1.

A mathematically particularly simple determination of the length l between the faulty point and the introduction point or a reference plane of the signal transmission path is achieved in that the length l is calculated according to the formula $l=\frac{1}{2} \cdot t_x \cdot c$, where c is a speed of propagation of RF signals in the signal transmission path, whereby $c=c_0/\varepsilon_{reff}$. The length l is thereby covered twice by the signal (forward and return path). A correction to take into account deviating runtimes within the measuring devices may also be necessary.

A particularly simple, fast and functionally reliable method is achieved in that in step (f) the relative phase positions of the digital signal $u_{Code}$ and the recovered digital signal $u_{demod}$ are shifted relative to one another until the digital signals are congruent, whereby the time difference $t_x$ is determined from the phase shift required to achieve congruence.

In a particularly preferred embodiment of the invention, the time shift is determined in step (f) by means of a cross-correlation and/or a convolution between the two digital signals $u_{demod}$ and $u_{Code}$.

According to the invention, a digital signal is understood to mean any signal which has a distinct and graduated set of values, for example a binary signal or also a digitized signal. The superimposed modulating signal can also be a digital noise signal, in particular a pseudo noise. This is particularly advantageous, since a cross-relation between two coinciding noise signals has a particularly sharp peak where the signals overlap in time, so that the faulty point is easily located.

In step (e), the digital signal can be derived from the intermodulation product signal by means of an analogue/digital conversion and/or a demodulation.

The method can be performed particularly simply, in terms of the necessary equipment, and in a functionally reliable manner, in that the form of modulation is an amplitude modulation (AM), a frequency modulation (FM), a phase modulation (PM), a quadrature amplitude modulation (QAM) or a different PQ modulation.

A particularly precise fault location is achieved using a simple technical set-up in that in step (d) a third-order intermodulation product IM3 is received, in particular the intermodulation product IM3 with the carrier frequency $2 \times f_1 - f_2$ or $2 \times f_2 - f_1$. Third-order intermodulation products are generally more likely to be generated at a faulty point than higher-order intermodulation products, whereby at the same time their carrier frequency can lie in a reception band RX of the signal transmission path, while $f_1$ and/or $f_2$ can lie in a transmission frequency range of the signal transmission path (whereby $f_1$ is preferably unequal to $f_2$). This simplifies detection and frequency ranges are measured which are relevant for the later use of the signal transmission path.

Alternatively, different-order intermodulation products can also be received, for example second, fifth, seventh order or similar.

A point which is faulty with regard to radio-frequency transmission properties of the signal transmission path can comprise at least one point at which a change, in particular a sudden change, in the RF characteristic impedance occurs, at which a faulty electrical contact occurs, in particular where a contact resistance occurs, which is greater than a predetermined value, and/or at which a non-linear transmission function for an RF signal is present.

The second RF signal can be a pure sinusoidal signal of the (carrier) frequency $f_2$ without any superimposed modulating signal.

The digital signal which is to be modulated onto the carrier frequency $f_1$ according to a particularly preferred embodiment of the invention is explained in more detail in the following.

It has proved particularly expedient to modulate a binary signal onto the carrier frequency $f_1$. The binary signal can for example have the values range 0 and 1 or alternatively the values range −1 and +1. A binary signal can be generated and processed using comparatively simple means.

In particular, the digital signal has a preferably periodic frame-clock signal $u_{frame}$ with a predefined clock duration $t_f$. The period duration $2*t_f$ of the clock signal can be adjusted to a bandwidth of the signal transmission path.

In order to improve the signal-noise ratio when locating faulty points, a digital base signal, in particular the periodic frame-clock signal, can be multiplied by a spreading code in order to generate the digital signal. The spreading code preferably consists of a sequence of preferably binary chips such as $\{-1, +1\}$ or $\{0, 1\}$. The number of chips of the spreading code is $l_C$ and the duration of a chip is $t_C$. The sequence of the chips is expediently selected such that the autocorrelation of the chip sequence for shifts unequal to 0 is minimal, while the autocorrelation should have a maximum at shifts equal to 0.

According to a particularly preferred embodiment, in order to generate the digital signal $u_{Code}$ a periodic frame-clock signal $u_{frame}$ is multiplied by such a spreading code $u_{Code}'$. In this way, a repeating sequence of digital pulses is generated in a spreading unit through cyclical multiplication of $u_{frame}$ with the spreading code. The chip duration $t_C$ is thereby given by $t_C=t_f/l_C$. This allows a digital base signal to be artificially expanded, as a result of which on the one hand the signal-noise ratio in the detector can be improved and on the other hand a spectral adaptation to the bandwidth of the transmission band TX and/or of the reception band RX is possible.

Through corresponding adjustment of the parameter $t_f$ of the frame-clock signal, $t_C$ of the chips, the chip sequence and/or the number of chips of the spreading code $l_C$, the digital signal $u_{Code}$ can be adjusted in terms of the length of the signal transmission path, the desired signal-noise ratio, the location resolution which is to be achieved, the transmission bandwidth which is to be used and/or the reception bandwidth which is to be used. A change in the aforementioned parameters also affects the bandwidth of the first RF signal $u_{Test}$ and of the intermodulation product signal $u_{RX}$ which is to be generated from this and received.

Preferably, the digital signal $u_{Code}$ is modulated onto a radio-frequency carrier with the carrier frequency $f_1$ using a bandwidth-efficient modulation method. Preferably, a modulation method is used in which the pointers of the symbols in the constellation diagram have the same length, because if the pointers have the same length more economical amplifiers can be used in comparison with methods in which the length of the signal pointer is variable. Digital modulation methods such as frequency shift keying, phase shift keying, continuous-phase frequency shift keying or similar have proved to be particularly expedient. Modulation methods with a required bandwidth B, within which 99% of the signal energy lies, of less than $1.5/t_C$, in particular less than $1.2/t_C$, where $1/t_C$ is the chip frequency, are advantageous. In terms of the required bandwidth B, Minimum Shift Keying MSK is optimal as a modulation method.

In the case of an RF signal with the carrier frequency $f_1$ and a second RF signal with the frequency $f_2$, a carrier frequency of the intermodulation product signal $u_{RX}$ of $f_{PIM}=nf_1+mf_2$, where $o=|n|+|m|$, preferably $o=3$, results. In this case the signal $u_{RX}$ has the bandwidth $B_{RX}=1.18*o/t_C$ where MSK is used as the modulation method.

According to one important aspect, the present invention is based on the basic idea of achieving an exact measurement of the distance of a fault location using a PIM measuring device through a bandwidth-efficient modulation method in combination with a code spreading method. The power of the intermodulation product signal (also referred to as the "PIM signal") can thereby be measured at different points in time using at least three receivers. Also, the location of the fault can be calculated from the measured three powers with great precision using a mathematical method.

A digital signal $u_{demod}$ can be recovered from the intermodulation product signal up through demodulation and if necessary digitization. The modulating digital signal $u_{Code}$ superimposed in step (a), in particular the digital base signal $u_{frame}$, multiplied by a spreading code $u_{Code'}$, is contained in the recovered digital signal $u_{demod}$.

In terms of achieving a simple yet reliable and exact determination of the time shift in step (f) it has proved advantageous to pass the recovered digital signal $u_{demod}$ (or alternatively the signal $u_{Code}$) with different predefined delays, for example at intervals of in each case a predefined fraction of a chip duration $t_C$, in particular around half a chip duration, to three or more receivers and therein compare said signal with the digital signal $u_{Code}$ (or alternatively the signal $u_{demod}$), in particular through multiplication of $u_{demod}$ with $u_{Code}$. For this purpose the digital signal $u_{demod}$ (or alternatively the signal $u_{Code}$) can be passed via three or more delay elements and in each case passed on to a detector. This leads to a clearly defined and readily visible maximum of the product between $u_{Code}$ and $u_{demod}$ in the detectors, with a predefined delay time between $u_{Code}$ and $u_{demod}$.

The product of the digital signal $u_{Code}$ and the recovered digital signal $u_{demod}$ as a function of the time shift between these signals can be approximated within the range of a maximum through a polynomial function, in particular through a parabola. The coefficients of the polynomial function can be determined, at least approximately, from the product values recorded at the same point in time by the three or more detectors, which each carry out measurements offset by a predefined time lag, which are preferably distributed around the maximum. The exact location of the maximum of the polynomial can then be calculated from the coefficients of the polynomial function, from which the runtime difference between the signals $u_{Code}$ and $u_{demod}$ can be determined.

The key advantage of this method is the high precision and location resolution which can be achieved.

Alternatively or additionally, it is possible to use a cross-correlation and/or convolution between $u_{Code}$ and $u_{demod}$ in order to determine the time shift.

In particular, the following steps can be provided in the method according to the invention:

a) calculating from the TX and RX band of a signal transmission path including a "Device under Test" (DUT) a first carrier frequency $f_1$, a second frequency $f_2$, the frequency of an intermodulation product signal $f_{PIM}$ or the order of the interference signal o;
b) calculating a frame-clock length and a spreading code length such that the bandwidth resulting together with the modulation method does not exceed the bandwidth of the signal transmission path;
c) generating a frame-clock;
d) generating a spreading code with the length calculated in step b);
e) generating a chip sequence through multiplication of the frame-clock with the code;
f) modulation of a carrier with the chip sequence; selection of the modulation method such that the signal which is to be received has the desired form following spreading of the signal at the faulty point;
g) transmission of the signal in the signal transmission path, preferably including an amplifier, a second, preferably sinusoidal signal source, a combiner, a filter and/or a DUT;
h) demodulation of the signal from the signal transmission path;
i) reception of the signal with several, but preferably at least 3 receivers which receive at staggered intervals, e.g., delayed by ½ a chip, whereby the reception time of one of the receivers is selected such that a maximum received power results;
j) measuring the received power from the at least 3 receivers;
k) determining the coefficients of an approximation of the time-shifted curve of the received power;
l) calculating the precise time of the maximum of the received power from the coefficients determined in step k); and
m) determining the location of the faulty point from the calculated point in time.

The method according to the invention can also be used to locate more than one faulty point with non-linear transmission function, as well as to estimate the power of the intermodulation products generated, individually or in total, at these faulty points.

According to an advantageous embodiment of the invention, the signal $u_{RX}$ received in step (d) contains intermodulation signal components generated at several faulty points of the signal transmission path, whereby at least one value of one of the intermodulation signal components such as a time shift with respect to a further intermodulation signal component or with respect to the digital signal $u_{Code}$, a curve, an amplitude, a power or similar are determined. In other words, distances between several faulty points, the distances of the individual faulty points from an introduction point or a reference plane of the signal transmission path and/or the generated intermodulation product power are measured. This is achieved in particular through selection of a spreading code and/or of a frame clock, which are adjusted to the sections of the signal transmission path which are to be scanned.

Parts of the measuring device itself such as filters, combiners or similar regularly generate intermodulation products in an input section of the signal transmission path, whereby these intrinsic intermodulation products are not of interest in terms of measuring a measuring section of the signal transmission path. Such intermodulation products are referred to as residual PIM (rPIM). According to a further embodiment of the invention, the generated intermodulation products can be assigned their point of origin within the signal transmission path. This makes it possible to disregard the residual PIM generated in an input section of the signal transmission path when locating faulty points and/or when measuring the power of the PIM generated in the measuring section.

In particular, the method according to the invention makes it possible to measure the power of the intermodulation generated in the signal transmission path as a function of the delay time $\tau$, in that the delay time between $u_{Code}$ and $u_{demod}$ is increased in the detector in predefined delay steps of $\tau=0$ to $\tau=t_f$, so that the entire signal transmission path is scanned for faulty points. The step width preferably amounts to a fraction of the chip duration $t_C$, for example half the chip duration.

It is also possible, by means of the method according to the invention, to determine at least one overall value such as the overall power, the signal strength or similar of the intermodulation components generated in a predefined partial section such as an input section or a measuring section of the signal transmission path.

In measuring devices according to the prior art, the inherent interference rPIM is not measured separately. Accordingly, the resolution of conventional measuring devices is limited through the inherent interference rPIM. In contrast, according to the present invention, the power of the generated intermodulation product as a function of the delay time is displayed, whereby for example only intermodulation products can be displayed which were generated outside of the measuring device in the signal transmission path. Alternatively or additionally, the added PIM powers in a predefined section of the signal transmission path are determined, added and/or displayed.

In other words, a measure for the power of intermodulation signal components depending on their time shift $t_x$ and/or a measure for the added power of intermodulation signal components with a delay time $t_x>x$ is determined, where x is a predefined threshold delay $t_{min}$.

According to a further aspect, the invention relates to a measuring device for carrying out of the method according to the invention. Such a measuring device has: a first signal generator with a modulator for generating the first RF signal $u_{Test}$ with a carrier frequency and a superimposed modulating digital signal, a second signal generator for generating the second RF signal, a combiner for introducing the two RF signals into the signal transmission path, a filter for receiving an intermodulation product of predefined order generated in the signal transmission path, a device such as a demodulator and/or an analogue/digital converter for recovering a digital signal from the intermodulation product signal and at least one detector and/or a computing unit for determining the time shift $t_x$. Preferably, the measuring device has at least one delay element for the delayed supply of the digital signal and/or of the recovered digital signal to the at least one detector in predefined delay steps.

Expediently, the first signal generator has a frame generator for generating a frame-clock signal, a code generator for generating a spreading code and a spreading unit for generating the digital signal from the spreading code and the frame-clock signal.

Preferably, at least one amplifier is provided for amplifying the first and/or the second RF signal before passing these to the combiner.

In particular, three or more detectors are provided, each of which is supplied with the recovered digital signal, whereby preferably three or more delay elements are provided for delaying the signal supplied to the detectors, in each case by a predefined time lag such as a fraction of the chip duration.

The measuring device can comprise further components for carrying out the method steps described above, individually or in any combination.

The invention is explained in more detail in the following with reference to the drawings, to which reference is expressly made with respect to details important to the invention which are not explained in detail in the description.

Embodiment 1: Distance Measurement

An embodiment for measuring the distance between a measuring device and an intermodulation interference signal in a signal transmission path is described in the following.

Figure 4:
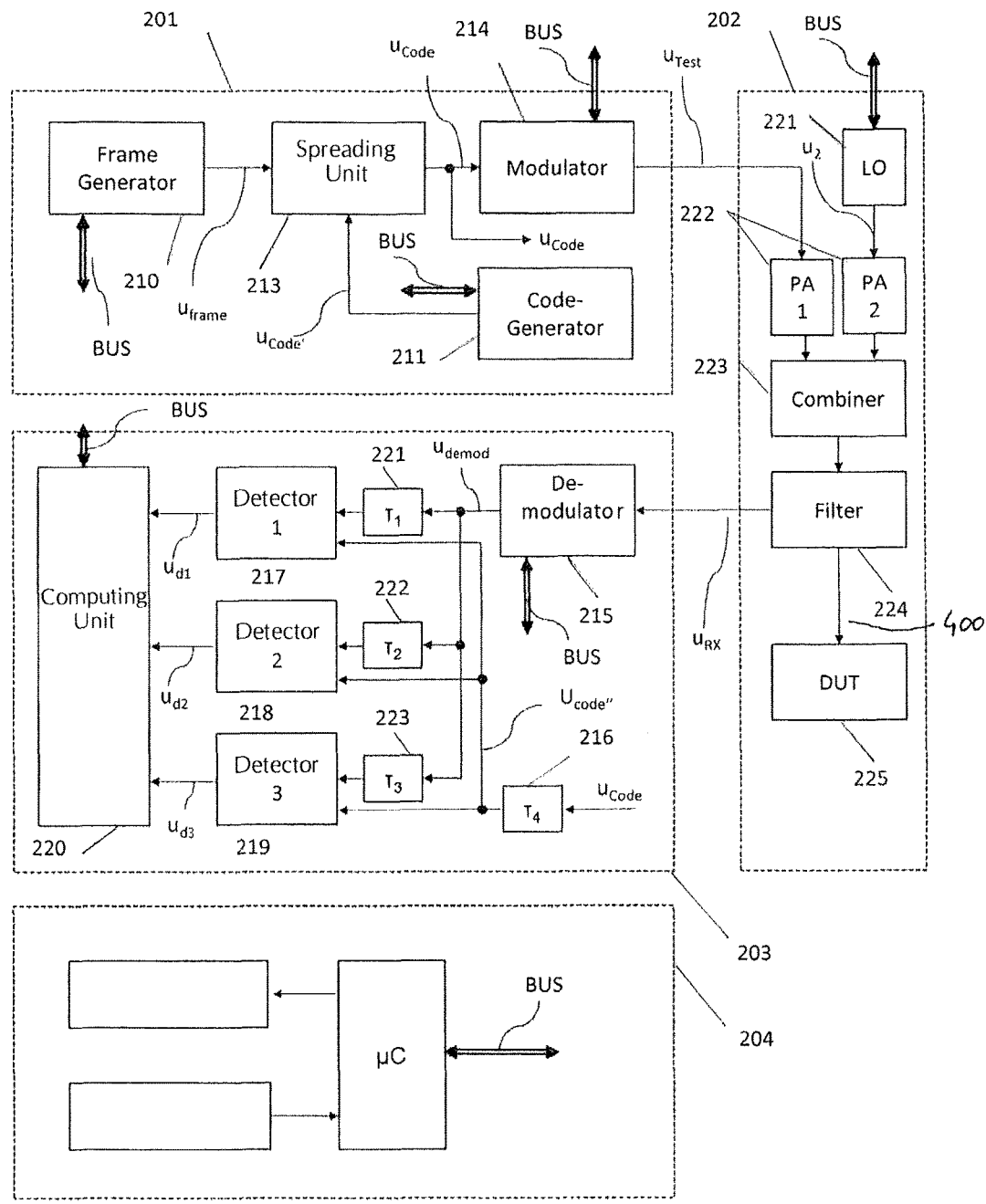
FIG. 4 is a schematic representation of a measuring device according to the invention for carrying out the measuring method according to the invention.

FIG. 4 is a schematic representation of a first measuring device according to the invention for carrying out the method for distance measurement according to the invention. This embodiment consists of a signal generator 201, a receiver 203, a transmission channel 202 and a controller unit 204.

Signal Generator:

The signal generator 201 consists of a frame generator 210, a code generator 211, a spreading unit 213 and a modulator 214.

Both the output signal $u_{frame}$ of the frame generator on the one hand and also the output signal of the code generator $u_{code}$, on the other hand are connected with the spreading unit. The output signal $u_{code}$ from the spreading unit is connected with the modulator 214. The frame generator 210, modulator 214 and code generator 211 are connected via the communications bus BUS with the controller unit 204.

The output signal $u_{test}$ is fed into the signal transmission path. Depending on the design of the measuring device, a second signal generator 221, two PAs 222, a combiner 223, a filter unit 224 and a DUT 225 can be provided. The signal generator 221 is connected via the communications bus BUS with the controller unit 204. The two RF signals $u_{Test}$ and $u_2$ are fed into the signal transmission path through the combiner 223.

Receivers:

The receivers consist of a demodulator 215, four delay elements 221, 222, 223 and 216, three detectors 217, 218 and 219 as well as a computing unit 220. The output of the transmission channel $u_{rx}$ is connected with the input of the demodulator 215. The output signal $u_{demod}$ of the demodulator 215 is connected with the delay elements 221, 222 and 223. The delay elements are in each case connected with a detector 217, 218 and 219. The delay element 216 is connected on the input side with the signal $u_{code}$, the output-side signal $u_{code}$ is connected with the three delay elements 221, 222 and 223. The three delay elements 221, 222 and 223 are connected with the detectors 217, 218 and 219. The output signals $u_{d1}$, $u_{d2}$ and $u_{d3}$ from the detectors 217, 218 and 219 are connected with the computing unit 220. The demodulator 215 and the computing unit 220 are connected via the communications bus BUS with the controller unit 204.

The signal forms as well as the function of the individual modules are described in the following.

Figure 5:
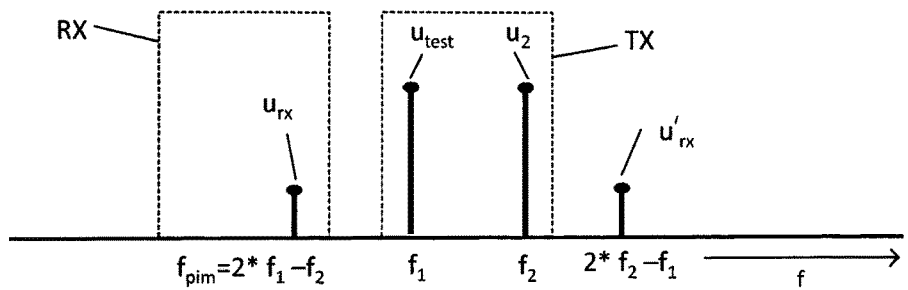
FIG. 5 shows, in schematic form, the position of the transmission and reception band of a signal transmission path as well as the position of intermodulation products $f_{PIM}$.
Figure 6:
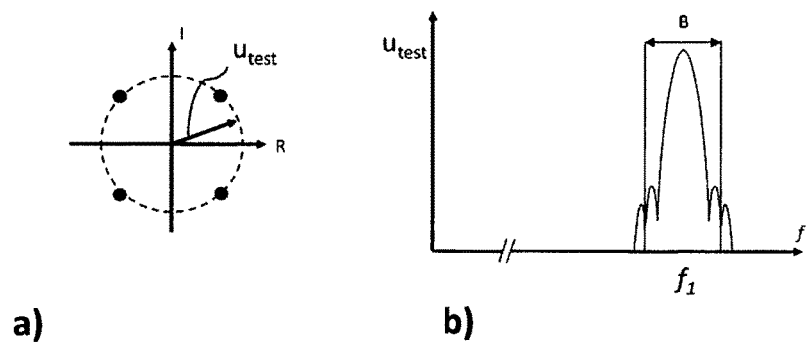
FIG. 6 shows, in schematic form, the generated first RF signal $u_{Test}$.

Bands, Frequencies for PIM Measurement:

In the described method, the modulators 214 and LO 221 of the measuring device represented in FIG. 4 are to be configured before a measuring procedure. The position and designations of the bands and frequencies relevant for the transmission device are shown in FIG. 5. The transmission band of a transmission device is designated in the following with TX, the reception band with RX. The two signals $u_{test}$ and $u_2$ have the frequencies $f_1$ and $f_2$ respectively. Intermodulation products of different orders o are generated at the non-linearity in the signal transmission path including the DUT, whereby $$f_{pim} = nf_1 + mf_2 \qquad (2)$$

$$o = |n| + |m| \qquad (3)$$

The variables m, n, o are whole numbers. The third-order intermodulation products are shown by way of example in FIG. 5. The signal $u_{rx}$ thereby falls into the relevant reception band RX, the signal $u'_{rx}$ lies outside of the reception band and is suppressed accordingly in the filter 224. In order to adjust the two frequencies $f_1$ and $f_2$, in the described embodiment, after entering the position of TX and RX in the controller unit according to (2) and (3), it is calculated in which frequency constellations the $f_{PIM}$ lie within RX. The value of $f_1$ is transmitted to the modulator 214, the value of $f_2$ to the LO 221 and the value of $f_{PIM}$ to the demodulator 215 via the communication bus BUS.

Figure 8:
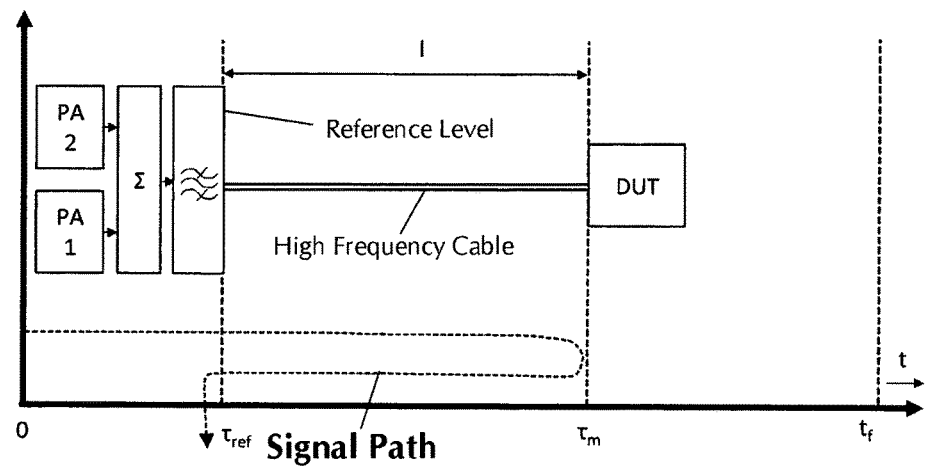
FIG. 8 shows, in schematic form, the runtime of an RF signal through the signal transmission path with connected DUT.

Distance Measurement:

The delays of the signal $u_{rx}$ in comparison with the signal $u_{test}$ are represented in FIG. 8. The signal $u_{test}$ is delayed by $\tau_{ref}$ up to the output of the filter, which usually represents the reference plane of a measurement. From the reference plane, as shown by way of example in FIG. 8, the test signal passes along a radio-frequency cable of the length l, which is connected with the DUT and forms a part of the signal transmission path. The signal $u_{rx}$ is generated through PIM and measured in the filter. The runtime between the reference plane and the filter is, accordingly $\Delta\tau = 2(\tau_m - \tau_{ref})$. The length l up to the interference signal can, accordingly, be determined through $$l = \frac{2c_0(\tau_m - \tau_{ref})}{\varepsilon_{reff}} \qquad (4)$$

For the precise measurement of $\tau_m$, special signals are generated in the signal generator 201 and received in the receivers 203 in an appropriate manner.

Figure 10:
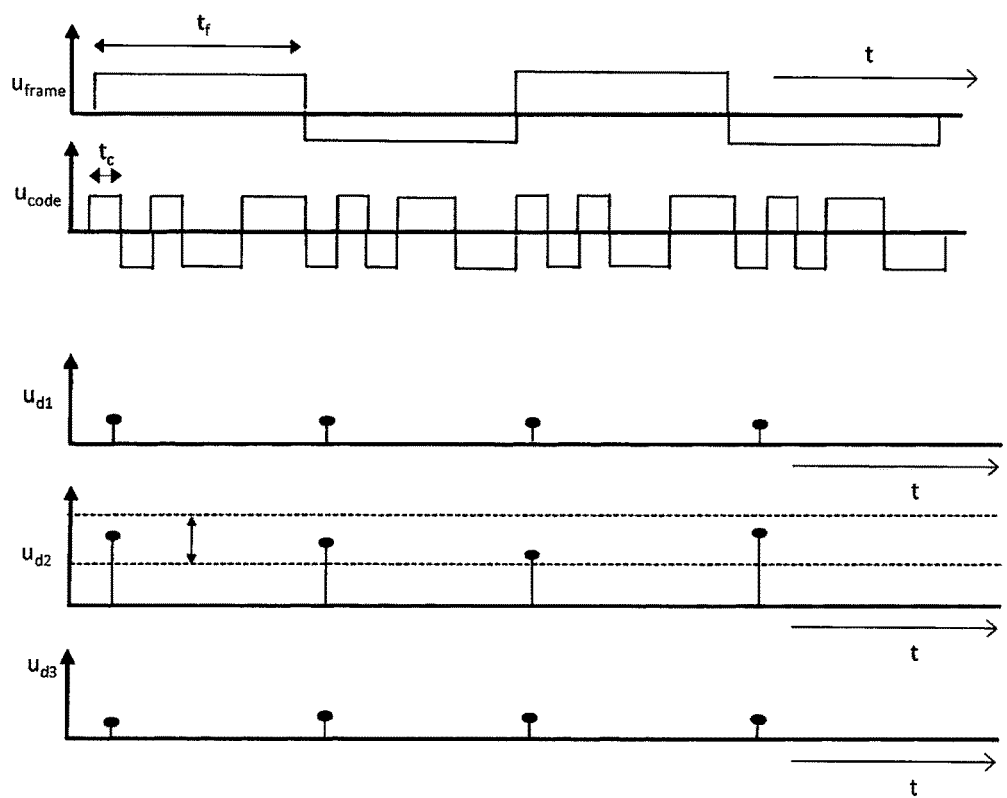
FIG. 10 shows the signal forms in the signal generator and in the receivers.
Figure 11:
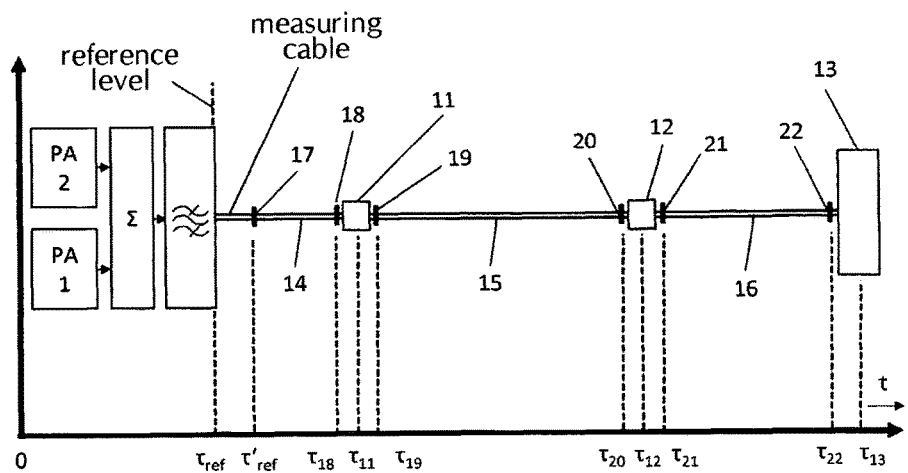
FIG. 11 shows, in schematic form, the signal runtimes during measurement of a signal transmission path.
Figure 12:
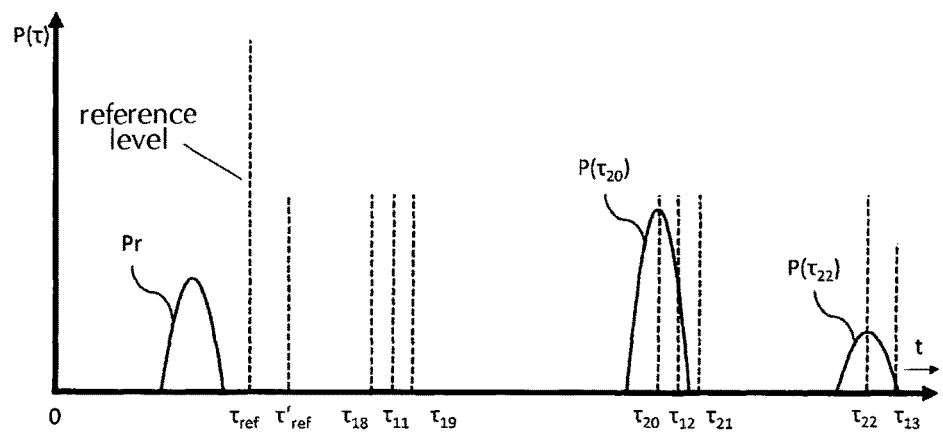
FIG. 12 shows the measured power of intermodulation products depending on the delay.

Generation of the Transmission Signal:

The generation of the signal $u_{code}$ of the signal generator according to FIG. 4 is explained in the following. The frame generator 210 generates a periodic frame signal $u_{frame}$. The frame signal $u_{frame}$ is represented in FIG. 10. The duration of a frame signal is thereby $t_f$. In the code generator 211, a digital code is generated which consists of a sequence of $\{-1; 1\}$. The code thereby has the length lc. The sequence of $\{-1; 1\}$ is, expediently, selected such that the autocorrelation of the sequence is minimal for shifts unequal to 0. The signal $u_{code}$ according to FIG. 10 contains a sequence of digital pulses, referred to in the following as chips, and is generated in the spreading unit through cyclical multiplication of $u_{frame}$ with the code. The chip length $t_c$ is thereby given through $$t_c = \frac{t_f}{lc} \qquad (5)$$

Modulation Method:

The function of the modulator 214 as shown in FIG. 4 is described in the following. The signal $u_{Code}$ is modulated in the modulator 214, using a bandwidth-efficient modulation method, onto a radio-frequency carrier with the frequency $f_1$. Key considerations for the selection of a modulation method are the required bandwidth B as well as the form of the constellation diagrams. If the pointer of the signal has a constant length in the constellation diagram, then more economical PAs can be used in the comparison with methods in which the length of the signal pointer is variable. In the described embodiment, Minimum Shift Keying (MSK) is used as the modulation method. The constellation diagram of $u_{test}$ is represented in FIG. 6a. The pointer of $u_{test}$ thereby has a constant length. The frequency spectrum of $u_{test}$ is represented in FIG. 6b. In the case of MSK, the required bandwidth B, within which 99% of the energy of the signal lies, amounts to $$B = 1.18 \frac{1}{t_c} \quad (6)$$

As a result of the intermodulation effect, the signal $u_{rx}$ has the bandwidth $B_{rx}$:

$$B_{rx} = 1.18 \frac{o}{t_c} \quad (7)$$

Figure 7:
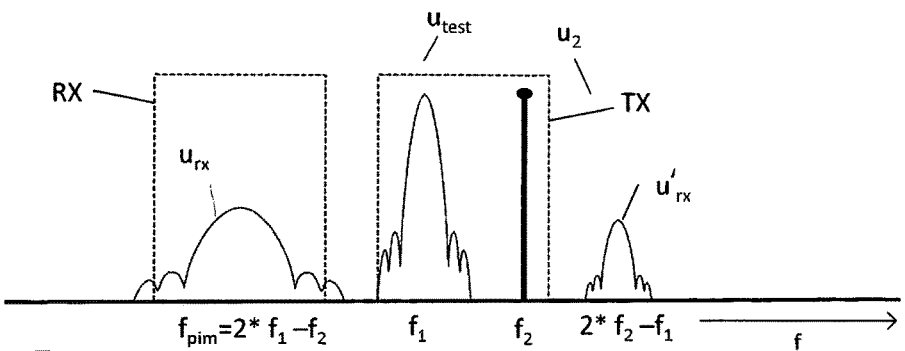
FIG. 7 shows, in schematic form, the bandwidth-optimized position of the first and second RF signal as well as the third-order intermodulation product generated from this.

The parameters $t_c$, $f_1$ and $f_2$ can be so selected that $f_{PIM}$ lies centrally within the RX band. This is illustrated in FIG. 7.

Reception and Distance Calculation:

The function of the receiver 203 shown in FIG. 4 is described in the following. In the demodulator 215, the signal $u_{RX}$ is received with the frequency $f_{PIM}$ and demodulated. The demodulated signal $u_{demod}$ is passed via the three delay elements 221, 222 and 223 to the detectors 217, 218 and 219 respectively. The three delay times τ1, τ2 and τ3 are advantageously selected such that:

$$\tau_2 = \tau_1 + \frac{1}{2} t_c \quad (8)$$

$$\tau_3 = \tau_2 + \frac{1}{2} t_c \quad (9)$$

A further delay element 216 delays the signal $u_{code}$, whereby $\tau_{4\ is}$ expediently selected such that $$\tau_4 = t_f \quad (10)$$

Through multiplication of the signal $u_{demod}$ delayed by a time τ with the signal $u_{code''}$, a signal $u_d$ is produced at the output of a detector which indicates the received power the PIM. The dependency of the signal $u_d$ on the delay is illustrated by way of example in FIG. 9. Depending on the selected modulation method and on the selected code, the signal $u_d$ falls off rapidly for values $\tau \neq \tau_m$. The 3 detectors measure the signal $u_d$ at different points in time $\tau_1$, $\tau_2$ and $\tau_3$, the output signals are designated with $u_{d1}$, $u_{d2}$ and $u_{d3}$. These are shown in FIG. 4 by way of example. The delay $\tau_1$ according to the equations (8) and (9) are changed until the signal $u_{d2}$ is at a maximum.

Figure 9:
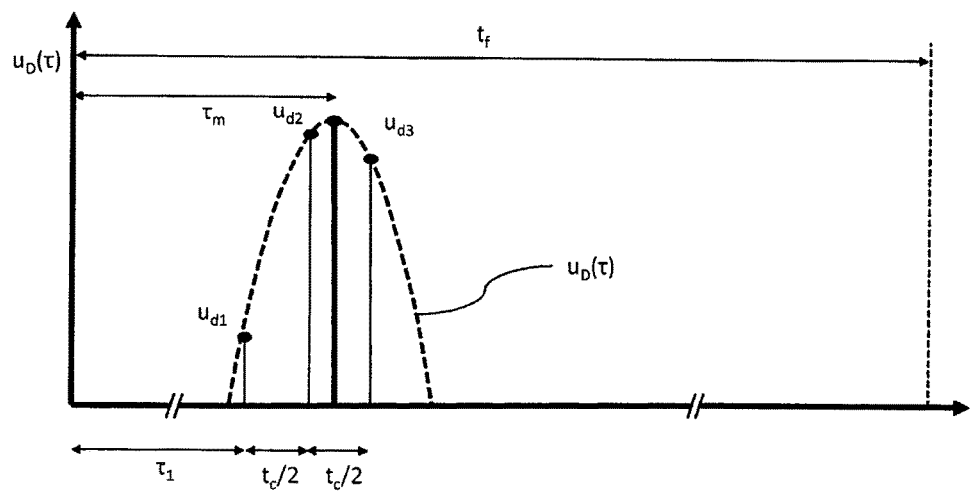
FIG. 9 shows, in schematic form, a method for determining the location of a fault.

The exact delay time of the signal up, in comparison with $u_{test}$ is estimated in the computing unit from the three signals $u_{d1}$, $u_{d2}$ and $u_{d3}$. This is for example achieved using a method as illustrated in FIG. 9. The development of u(τ) is approximated through a parabola according to $$u_{rx}(\tau) = a_0 + a_1 \tau + a_2 \tau^2 \quad (11).$$

The three parameters $a_0$, $a_1$ and $a_2$ are determined from the three values $u_{d1}$, $u_{d2}$ and $u_{d3}$. The value $\tau_m$ is determined in the computing unit from the equation (6). The periodic repetition of the code with the period duration $t_f$ produces a uniqueness range which is indicated in FIG. 9. The main advantage of the disclosed method is the high precision which can be achieved.

Embodiment 2: Time Window Method

A second embodiment involving a further expedient variant of the method is described in the following. The resolution of a measuring device according to FIG. 4 can be significantly improved through the use of a time window method.

Principle of Inherent Interference and Multiple Interfering Signals:

The purpose of the measuring device according to FIG. 4 is not only to measure the distance between the fault location and the measuring device, but also to measure its power. In the example of the transmission path according to FIG. 1 there are several points in the signal transmission path from the BTS up to the antenna at which intermodulation can occur. The individual modules of the signal transmission path according to FIG. 1 are entered in FIG. 11 together with the measuring device according to FIG. 4. Starting out from the measuring device, the signal transmission path runs via a transmission cable. According to FIG. 11, the intermodulations at the individual possible fault locations, namely the plug connectors 17, 18, 19, 20, 21, 22, on the filters 11 and 12 and in the antenna 13, have different delay times τ.

However, intermodulation products can occur not only in the transmission path between BTS and antenna, but also within the measuring device. The intermodulation interference which occurs within the measuring device is referred to in the following as rPIM (residual PIM).

Location of the Interference in Terms of Time:

The method according to the invention makes it possible to measure the power of the PIM in relation to the delay time τ, in that the values of $\tau_1$, $\tau_2$ and $\tau_3$ are systematically varied in the measuring device according to FIG. 4 taking into consideration (8) and (9). Starting with 0, $\tau_2$ is for example thereby increased in steps of ½ $t_c$ until $\tau = t_f$ is reached. $t_f$ can be selected to be longer than the time taken to pass through the entire signal transmission path. The development of the power in relation to the delay measured in this way is represented by way of example in FIG. 12 for the case that an inherent interference rPIM (designated with $P_r$) and a fault at the plug connector 20 and at the plug connector 22 occur.

Elimination of the Interference:

In measuring devices according to the prior art, the inherent interference is not measured separately. The resolution of the measuring device is consequently limited through the inherent interference. In the disclosed embodiment, either the power is displayed in relation to the delay time, whereby only PIM outside of the measuring device is displayed or, alternatively, the added powers $P_s$ are displayed.

$$P_s = \sum_{i=1}^{n} P(\tau_i); \tau_i > \tau'_{ref} \qquad (12)$$

An advantage of this method is that it significantly increases the measuring accuracy of the measuring device.

Embodiment 3: Locating a Faulty Point

Figure 13:
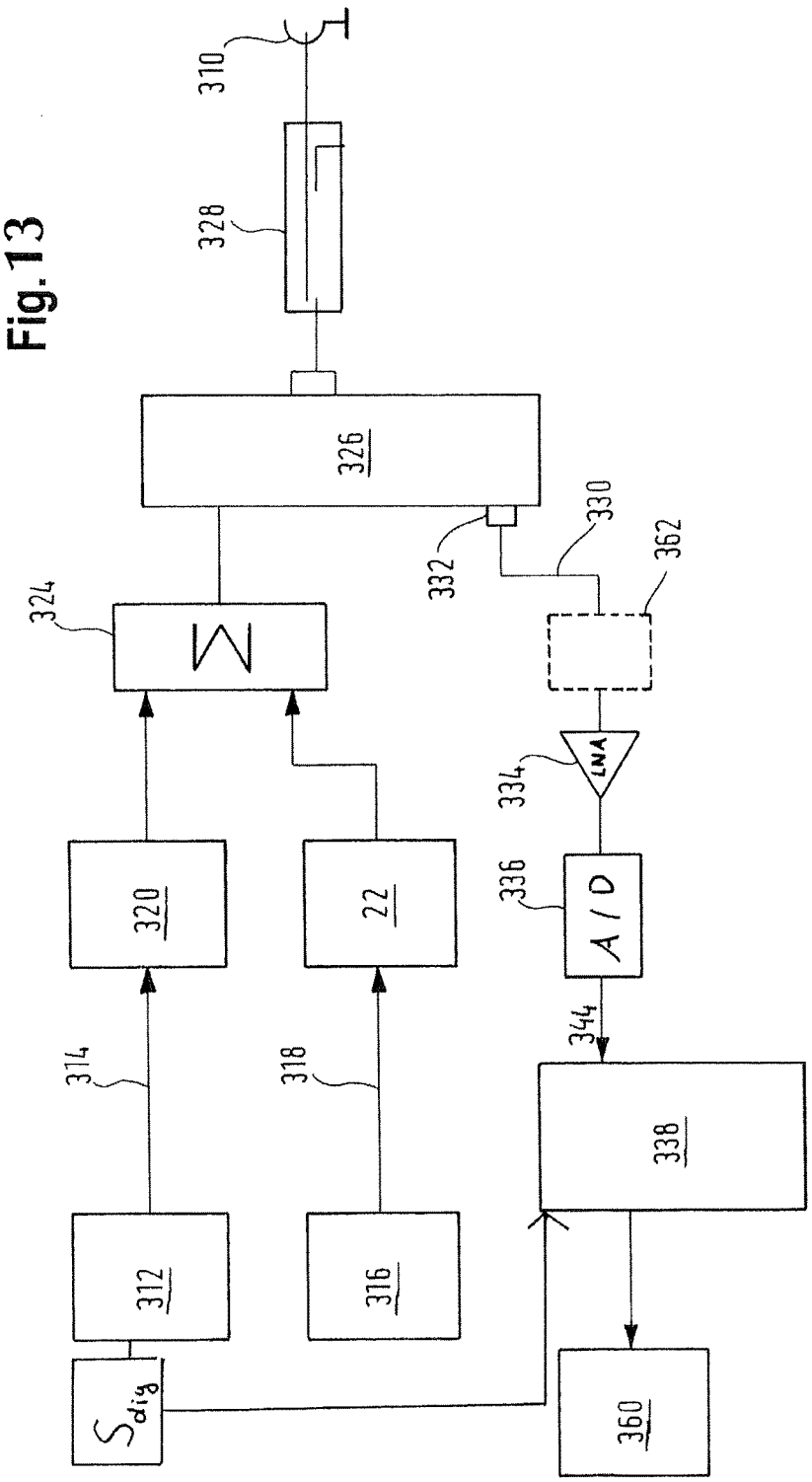
FIG. 13 shows a further embodiment of a measuring device for carrying out the method according to the invention in the form of a schematic flow chart.

The further embodiment of the method according to the invention shown by way of example in FIG. 13 relates to the analysis of a signal transmission path, which is electrically connected at an introduction point 310, with respect to fault locations which affect the RF transmission properties. These fault locations cause a non-linear transmission function with respect to the transmission of RF signals. The present method exploits the fact that such non-linear transmission functions lead to the generation of intermodulation products if two RF signals of differing frequency arrive at such a point with non-linear transmission function simultaneously. These intermodulation products are generated at these points and do not represent a reflection of an infed signal, but a new RF signal not previously present in the signal transmission path which is referred to here as an intermodulation signal or also intermodulation product.

A first RF signal 314 with a predetermined, constant frequency $f_1$ is generated in a first block 312. A digital signal $S_{dig}$, for example a digital noise signal, is modulated onto this first RF signal 314. An I/Q modulation is for example used as modulation method here; however, it is also possible to use any other known modulation type. A second RF signal 318 with a predetermined constant frequency $f_2$ is generated in a second block 316.

In a third block 320 the first RF signal 314 is amplified and in a fourth block 322 the second RF signal 318 is amplified. After amplification in the blocks 320 and 322 the two RF signals 314, 318 are passed to a combiner 324. The combiner 324 passes the RF signals 314, 318 combined in one cable to a fifth block 326 which contains a duplex filter and feeds the first as well as the second RF signal 314, 318 into the signal transmission path via a coupler 328 at the introduction point 310. On their way through the signal transmission path these two RF signals 314, 318 may encounter a point with non-linear transmission function, for example a defective RF plug connector, a poor solder joint or a cable break, so that essentially undesirable intermodulation products, for example the third-order intermodulation product IM3 (for example 2× the first RF signal minus 1× the second RF signal or similar), are generated from the two RF signals 314, 318. The frequency $f_{PIM}$ of the third-order generated intermodulation product IM3 330 thus results from the carrier frequency $f_1$ of the first RF signal 314 and from the frequency $f_2$ of the second RF signal 318 according to the equation $2 \times f_1 - f_2$. The intermodulation products return to the introduction point 310 as signals or intermodulation products or intermodulation product signals generated in the signal transmission path.

At the same time, by means of the fifth block 326, a signal generated in the signal transmission path is received at the introduction point 310 and the third-order intermodulation product IM3 330 with a frequency $f_{PIM}$ is filtered out by means of the duplex filter and output via an output 332. This received IM3 330 is passed on to a sixth block 338 via an amplifier ("LNA low noise amplifier") 334 and an A/D converter 336. The A/D converter 336 generates a digital signal 344 $u_{demod}$, which substantially corresponds to the original digital signal $S_{dig}$, but is time-shifted in relation to this due to the runtime through the signal transmission path.

The original digital signal $S_{dig}$ is also passed on to the sixth block 338. The digital signal $S_{dig}$ and the digital signal $u_{demod}$, which the A/D-converter 336 supplies, are time-shifted in relation to one another due to runtime differences, since the received intermodulation product IM3 330 has additionally travelled at least the distance L to the point with non-linear transmission function as well as the distance L back again from the point with non-linear transmission function to the introduction point 310.

In the block 338, which is for example designed in the form of an FPGA ("Field Programmable Gate Array), the signals $u_{demod}$ and $S_{dig}$ are compared with one another. This can take place by means of a cross-correlation. A runtime difference $t_x$ between the two signals can be determined from the maximum of the cross-correlation function.

In other words, the amplitude curves of the two signals are time-shifted relative to one another by means of the cross-correlation until the two amplitude curves are congruent. The necessary shift t corresponds exactly to the runtime difference $t_x$ between the two signals.

The length l between the introduction point 310 and the defective point to be located in the signal transmission path can be determined in a simple manner from this runtime difference $t_x$ according to $$l = \frac{1}{2} \cdot t_x \cdot c,$$

where c is a speed of propagation of RF signals in the signal transmission path. This distance L is the distance from the introduction point 310 to a point at which the third-order intermodulation product IM3 330 was generated in the signal transmission path from the first and second RF signals 314, 318.

This distance or length l now only needs to be measured along the signal transmission path 310 and one arrives at precisely the location within the signal transmission path 310 at which a fault with non-linear transmission function is located which affects the RF transmission characteristics of the signal transmission path 310. This can be a break in an RF cable or a fault in the antenna or a defective RF plug connector or a defective solder joint. Naturally, several faulty points may also be present simultaneously in the signal transmission path. In this case several intermodulation products IM3 330 are received at staggered intervals which can all be analysed simultaneously, so that several runtime differences $t_x$ and several lengths l can be determined. The fact that a newly generated intermodulation product is used as the considered received signal ensures that the length l only relates to a defective point with non-linear transmission function and not to any other reflection of an RF signal with different causes or different sources.

The block 338 is connected with a computer 360 for the purpose of control and data output.

The third-order intermodulation product IM3 is used in the preferred embodiment of the method according to the invention represented in FIG. 1. However, this is used purely by way of example, and other intermodulation products can also be used, for example the second order, fourth order, fifth order or higher intermodulation product. The only important thing is that the original digital signal is correctly recovered from the intermodulation product in the A/D converter 336.

Practically, a device for carrying out the method according to the invention is calibrated before the first measurement in order to eliminate measurement-related runtimes of the signals compared in block 338 in the electronic evaluation system before the introduction point 310 outside of the signal transmission path.

Optionally, a frequency converter (down-converter) 362 is provided for the received IM3 330 which converts the frequency of the IM3 to a frequency suitable for the LNA 334 and the A/D converter 336.

The method according to the invention is not limited to the described embodiments. The digital signal can also be of different composition and/or the second RF signal can also contain a digital signal modulated thereon or similar.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for locating points in a signal transmission path for a radio-frequency signal which is faulty with regard to radio-frequency transmission properties of the signal transmission path, wherein a first Radio Frequency (RF) signal $u_{Test}$ which has a carrier frequency $f_1$ is generated, said method comprising:
   (a) modulating a digital signal $u_{Code}$ onto the first RF signal $u_{Test}$;
   (b) generating a second RF signal $u_2$ having a frequency $f_2$;
   (c) introducing the first RF signal $u_{Test}$ and the second RF signal $u_2$ into the signal transmission path at a predetermined introduction point;
   (d) receiving an intermodulation product, which is generated in the signal transmission path from the first RF signal and the second RF signal at at least one faulty point and reflected back to the introduction point, in the form of an intermodulation product signal $u_{RX}$;
   (e) recovering a digital signal $u_{demod}$ from the intermodulation product signal through demodulation;
   (f) determining a time shift $t_x$ between the digital signal $u_{Code}$ and the recovered digital signal $u_{demod}$; and
   (g) calculating the length L between the introduction point and the point in the signal transmission path at which the signal received in step (d) was generated from the time shift $t_x$ determined in step (f).

2. The method of claim 1, including multiplying a periodic frame-clock signal $u_{frame}$ by a spreading code $u_{code'}$ in order to generate the digital signal $u_{Code}$ in step (a).

3. The method of claim 2, wherein the spreading code $u_{Code'}$ has a sequence of chips, wherein a length of the frame-clock of the frame-clock signal $u_{frame}$, a length of the spreading code $u_{Code'}$ and/or the number of chips of the spreading code $u_{Code'}$ are calculated such that a resulting bandwidth of the first RF signal $u_{Test}$ and/or of the intermodulation product signal $u_{RX}$ adapted to the length of the signal transmission path and/or to a used transmission and/or reception bandwidth of the signal transmission path is obtained.

4. The method of claim 1 wherein a bandwidth-efficient digital modulation method including Frequency Shift Keying (FSK) or Continuous Phase Frequency Shift Keying (CPFSK) or Minimum Shift Keying (MSK) is used in step (a).

5. The method of claim 1, wherein the length L is calculated according to the formula $$L = \frac{1}{2} \cdot t_x \cdot c,$$

where c is a speed of propagation of RF signals in the signal transmission path.

6. The method of claim 1, wherein in step (f) the relative phase positions of the digital signal $u_{Code}$ and the recovered digital signal $u_{demod}$ are shifted relative to one another until the digital signals are congruent, and/or the intermodulation product signal is at a maximum, wherein the time difference $t_x$ is determined from the phase shift required to achieve congruence or the maximum.

7. The method of claim 1, wherein in step (f) the recovered digital signal $u_{demod}$ is passed with different predefined delays, at intervals of in each case a predefined fraction of a chip duration to three or more receivers and multiplied therein by the, if necessary delayed, digital signal $u_{Code}$, or vice versa.

8. The method of claim 7, wherein the intermodulation product signal, as a function of the time shift, is approximated through a polynomial function, the coefficients of which are calculated from the multiplication values determined by the three or more receivers, wherein at least one maximum of the polynomial function is then preferably calculated from the coefficients.

9. The method of claim 8 wherein said polynomial function includes a parabola.

10. The method of claim 1, wherein the time shift is determined in step (f) by a cross-correlation.

11. The method of claim 1, wherein a third order intermodulation product IM3, in particular the intermodulation product with the carrier frequency $2 \times f_1 - f_2$ or $2 \times f_2 - f_1$, is received in step (d).

12. The method of claim 1, wherein the signal $u_{RX}$ received in step (d) contains intermodulation signal components generated at several faulty points of the signal transmission path, wherein at least one value of one of the intermodulation signal components are determined, including a time shift with respect to a further intermodulation signal component or with respect to the digital signal $u_{Code}$, a curve, an amplitude, or a power characteristic.

13. The method of claim 12, including determining at least one overall value such as the overall power or the signal strength of the intermodulation signal components generated in a predefined partial section including an input section or a measuring section of the signal transmission path.

14. The method of claim 12 including determining the power of intermodulation signal components depending on their point of generation and/or a measure for added power of intermodulation signal components with a delay time $t_x > x$, where x is a predefined threshold delay $t_{min}$.

15. The method of claim 3 wherein a bandwidth-efficient digital modulation method including Frequency Shift Keying (FSK) or Continuous Phase Frequency Shift Keying (CPFSK) or Minimum Shift Keying (MSK) is used in step (a).

16. The method of claim 15, wherein in step (f) the relative phase positions of the digital signal $u_{Code}$ and the recovered digital signal $u_{demod}$ are shifted relative to one another until the digital signals are congruent, and/or the intermodulation product signal is at a maximum, wherein the time difference $t_x$ is determined from the phase shift required to achieve congruence or the maximum.

* * * * *

UNITED STATES PATENT AND TRADEMARK OFFICE
CERTIFICATE OF CORRECTION

PATENT NO.         : 10,237,001 B2
APPLICATION NO.    : 15/310867
DATED              : March 19, 2019
INVENTOR(S)        : Martin Schwab et al.

Page 1 of 1

It is certified that error appears in the above-identified patent and that said Letters Patent is hereby corrected as shown below:

In the Specification

In Column 6 Line 54 delete "PQ" and substitute therefor -- "I/Q" --

In Column 8 Line 29 delete "up" and substitute therefor -- "$U_{rx}$" --

In Column 13 Line 66 delete "up" and substitute therefor -- "$U_{rx}$" --

Signed and Sealed this
Twenty-third Day of July, 2019

Andrei Iancu
*Director of the United States Patent and Trademark Office*